Dec. 26, 1950 T. G. BARNES ET AL 2,535,255
ELECTRICAL SYSTEM FOR LOCATING A SOUND SOURCE
Filed May 23, 1945 2 Sheets-Sheet 1
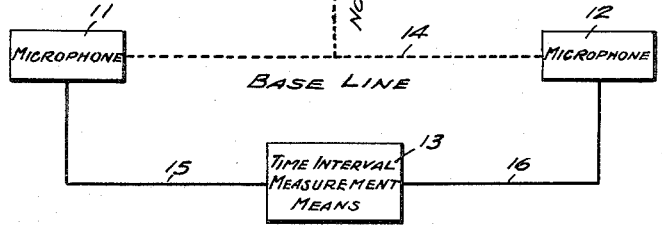
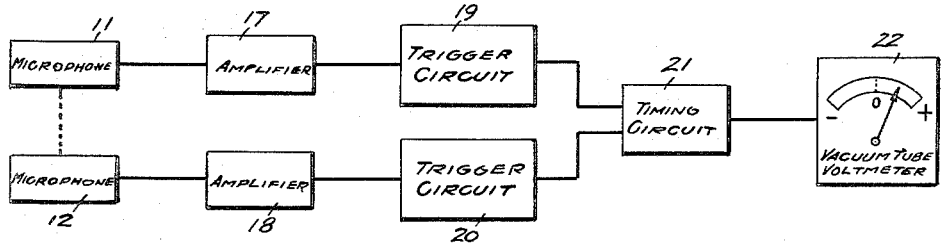
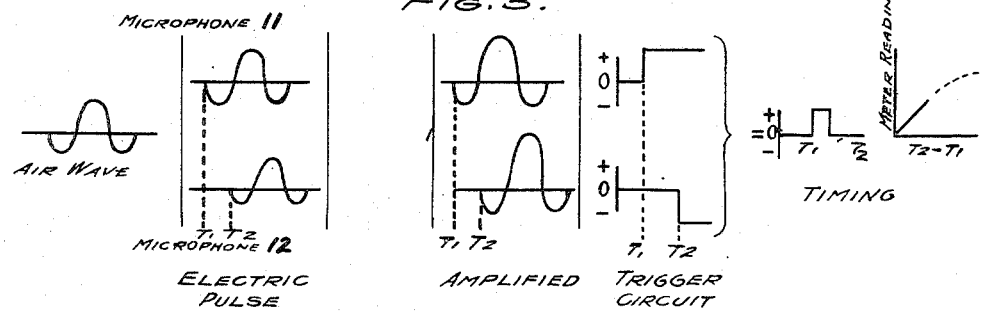
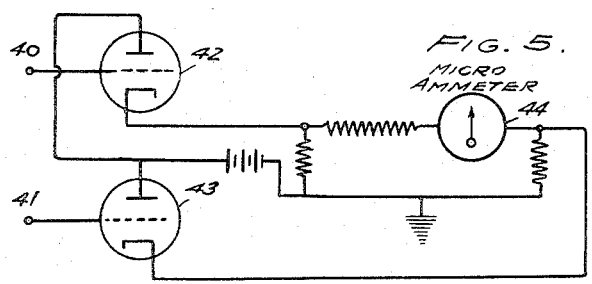
INVENTORS
T. G. Barnes
M. J. Burger
BY William D. Hall.
ATTORNEY Dec. 26, 1950 — T. G. BARNES ET AL — 2,535,255
ELECTRICAL SYSTEM FOR LOCATING A SOUND SOURCE
Filed May 23, 1945 — 2 Sheets-Sheet 2

INVENTORS
T. G. Barnes
M. J. Burger
BY William D. Hall.
ATTORNEY

Patented Dec. 26, 1950

2,535,255

UNITED STATES PATENT OFFICE 2,535,255

ELECTRICAL SYSTEM FOR LOCATING A SOUND SOURCE

Thomas G. Barnes, Durham, N. C., and Michael J. Burger, Murray Hill, N. J., assignors to the United States of America as represented by the Secretary of War Application May 23, 1945, Serial No. 595,352

7 Claims. (Cl. 177—352.6)

This invention relates to methods and apparatus for the measurement of time differences between impulses and more particularly to sound direction finding and ranging.

One object of our invention is to provide a method for determining the direction of a sound source and the range of said sound source from a fixed position.

Another object of our invention is to provide suitable apparatus for determining the direction and the range of a sound source from a fixed position.

In present day sound ranging and direction finding systems and apparatus such as used for locating the position of enemy artillery of various types it is the general practice to place a plurality of sound sensitive devices along an extended base line that is substantially perpendicular to the line of direction of the point from which the sound is expected to emanate. By observing the time interval between the sound's arrival at the plurality of sound sensitive devices thus situated, it is possible to calculate the direction and range of the sound source after necessary correction is made for the effect of wind, temperature, and humidity, upon the speed and direction of travel of the sound through the atmosphere. Prior devices for measuring the time interval between the arrival of sound waves at a plurality of sound-sensitive devices have been complicated and bulky, thus reducing their effectiveness in the field. It is a further object of our invention to provide a simple and effective method of measuring such time intervals so that a direct indication may be obtained. It is still another object of our invention to provide a simple and effective apparatus that will give a direct measurement of the time interval between the sound's arrival at each of a pair of sound sensitive devices, combined with an indication of which sound sensitive device received the sound first. It is also an object of our invention that a plurality of the composite devices as described herein be used to determine the range as well as the direction.

Other objects and advantages will become apparent in the following specification of embodiments of the invention illustrated in the accompanying drawings, wherein:

Figure 1 is a schematic arrangement of our device.

Figure 2 is a block diagram of the entire apparatus.

Figure 3 approximates the wave forms present in each portion of our device.

Figure 4:
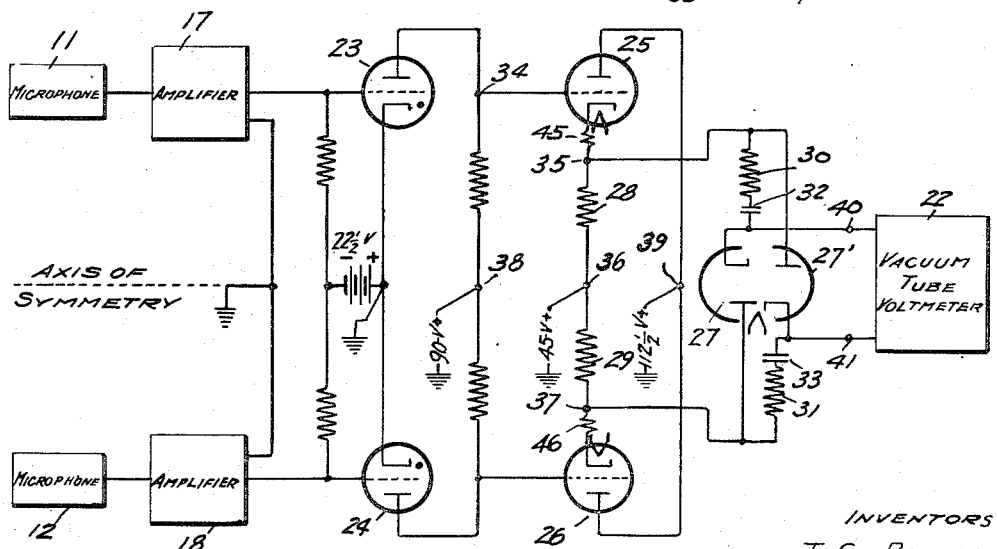

Figure 4 is a simplified schematic diagram of a device embodying our invention.

Figure 5 is a schematic diagram of the vacuum tube voltmeter circuit used in our invention.

Figure 6:
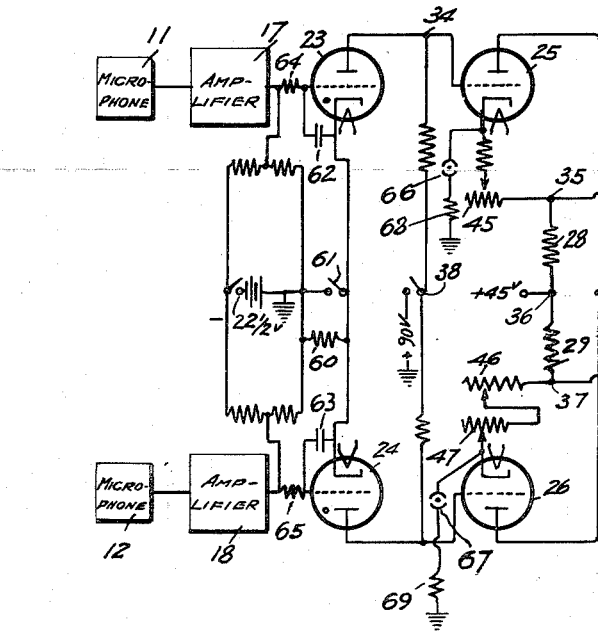

Figure 6 is a more complete schematic diagram of a device embodying our invention.

Referring to Figure 1 which shows in schematic fashion the field arrangement of our invention, 10 is a source of sound waves whose direction and range relative to the reference or base line 14 it is desired to determine. Two or more sound sensitive devices such as microphones 11 and 12 are spaced apart on the base line, usually at a distance of about 400 feet from each other. This base line distance is not critical and any distance may be used within that from which reasonable accuracy may be expected. The orientation of the base line 14 preferably is such that the normal to the base line passes through that portion of territory in which the sound source to be located is believed to be situated. The two microphones 11 and 12 are connected by lines 15 and 16 to the time interval measurement means 13. The time interval measurement means 13 gives an instantaneous reading of the time interval between the arrival of the sound at microphones 11 and 12, as well as an indication as to which microphone received the sound first. Furthermore an indication is given of the fact when both channels receive impulses simultaneously.

Referring to Figure 2 which is a block diagram of the entire apparatus it is seen that there are two symmetrical channels, one for each microphone. The output of microphone 11 is fed into an amplifier 17, the output of which is fed into a trigger circuit 19. In a like manner the output of microphone 12 is amplified in amplifier 18 and then fed into trigger circuit 20. The operations of the trigger circuits 19 and 20 each produce a change in the flow of a direct current, which currents are then combined in the timing circuit 21 to produce a pulse whose duration is equal to the difference in the sound arrival times at microphones 11 and 12.

Figure 3 illustrates the sequence of operation in each portion of the apparatus shown in Figure 2. Approximate wave forms are shown for purposes of illustration. Each microphone is poled in its connection to the apparatus so that the compression part of the sound wave actuates it to produce a potential at the grid of the trigger tube which potential is in the positive direction, thereby overcoming its bias potential. The air wave strikes microphone 11 at a time $T_1$, and the microphone 12 at a time $T_2$. The signals are amplified selectively, such that low frequency wind interference signals are suppressed, and applied to their respective trigger circuits which change the flow of direct current as shown, beginning at times $T_1$ and $T_2$ respectively. In the timing circuit 21 the resulting potentials are combined to produce a pulse whose duration is equal to the difference $(T_2-T_1)$ in the sound arrival times at the microphones 11 and 12. The timing circuit 21 thereupon functions to provide a voltage proportional to the time difference, which voltage is applied to the vacuum tube voltmeter 22.

Referring now to Figure 4 which is a simplified schematic diagram of our invention, the trigger circuit used will now be explained. This circuit comprises a gas filled triode 23 that is normally nonconducting, and a vacuum triode 25 that is normally conducting. Since our device has two symmetrical channels, a duplicate trigger circuit for microphone 12 uses gas triode 24 and vacuum triode 26. Although the explanation that follows will pertain to one of the two symmetrical channels it is to be understood that the explanation applies equally as well to the other identical channel. Point 38 is maintained at 90 volts. Point 39 supplying plate potential to tubes 25 and 26 is maintained at 112½ volts. When the gas tube 23 is not conducting point 34 will also be at this potential of 90 volts. Since the potential at point 34 is more positive than that of point 36, plate current flows in the vacuum triode 25. This flow of plate current establishes the potential level of the cathode of vacuum triode 25 at about 91 volts and the potential level of point 35 at about 71 volts. The point 36 of the plate supply battery on the vacuum triode remains at +45 volts above ground. The purpose of the trigger circuit is to abruptly cut off the flow of current in 28 when a positive pulse from the amplifier 17 reaches the negatively biased grid of the gas tube 23 and causes the tube to strike. The instant the gas tube 23 breaks down, the potential drop across it goes down to about 20 volts. When point 34 drops to +20 volts the vacuum triode 25 ceases to conduct because the potential of point 35 cannot drop below +45 volts, and hence a 25 volt negative bias is impressed on the grid of tube 25. When tube 25 ceases to conduct it ceases to draw plate current through resistance 28, and the potential at point 35 drops to essentially that of point 36, i. e., the potential across resistance 28 is reduced essentially to zero. This loss in voltage reacts on the timing circuit as indicated below.

The timing portion of our device operates in the following manner: Referring to the schematic diagram in Figure 4 it is seen that points 35 and 37 are initially at equal potentials of +71 volts. Condensers 32 and 33 are connected to points 35 and 37 through charging resistors 30 and 31 respectively and are uncharged, since points 40 and 41 are at equal potentials of approximately +71 volts. Upon the triggering action reducing the voltage across 28 to zero it will be observed that a potential difference is established between 35 and 37 in such a direction that the diode 27 becomes conducting but the diode 27' does not. Condenser 32 thereupon starts charging through resistance 30 in order to equalize this potential difference. However, the product of the condenser 32 and resistance 30, commonly known as their time constant, is made large enough to reduce the charging rate to such a degree that the condenser 32 is never charged to more than ⅙ or ⅛ of its ultimate potential during any time intervals which the device is intended to be required to measure. By these means the charge on 32 will be proportional within a very close approximation to the time interval during which the circuit is maintained in the condition to continue the charging action.

When the sound impulse arrives at microphone 12 it triggers the other gas tube 24 thereby dropping the voltage across resistance 29 to zero. The plate of diode 27 drops to +45 volts thereby stopping the charging of condenser 32, point 40 then being at a potential slightly greater than 45 volts. Due to the unilateral conductance of tube 27 the charge is locked on condenser 32. Since no current has as yet flowed in diode 27' both sides of condenser 33 are at a potential of +45 volts. Thus point 40 is left at a potential slightly higher than point 41, this potential being proportional to the time interval between the triggering of tube 23 and tube 24. This difference in potential is then indicated on a vacuum tube voltmeter 22 of very high input impedance. Since this difference in potential depends on the time interval between the triggering pulses, the vacuum tube voltmeter reading may be calibrated in terms of time interval.

At this juncture an automatic overload prevention feature will be described. If the microphone 12 should be inoperative or the sound impulses arriving thereupon be of a low energy level the action described immediately above would not occur and it might appear that the voltmeter would be driven such as to increase the microammeter reading beyond its full scale reading and possibly damage the instrument. That this is prevented in one circuit may be seen with the aid of the following tabulation wherein the potentials, at the several points indicated, are given in time sequence beginning with the triggering of gas triode 23 and continuing through the triggering of the gas triode 24 due to reception of a sound impulse by microphone 12. A final column gives the potentials existing at the several points if gas triode 24 is not triggered.

TABLE

*Potentials at various times of triggering cycle*

|  | Before Trigger | When gas triode 23 is triggered to say time $T_1$ | At time $T_2$ corresponding to say full scale of the voltmeter | At time $T_2$ corresponding to triggering of other channel | At a great interval of time if second channel is not Triggered |
|---|---|---|---|---|---|
| Point 35 | 71 | 45 | 45 | 45 | 45 |
| Point 40 | 71 | 70 | 70 | 48 | 71 |
| Point 41 | 71 | 71 | 71 | 45 | 71 |
| Point 37 | 71 | 71 | 71 | 45 | 71 |
| Junction of 30 & 32 | 71 | 70 | 67 | 45 | 45 |
| Junction of 31 & 33 | 71 | 71 | 71 | 45 | 71 |

Referring to the table the first column lists the several points whose potentials are of interest at this juncture. Column two lists the potentials at these points in the standby condition, that is, up until the reception of the signal by microphone 11. It will be noted that all points are at the same potential including points 40 and 41. In column three the potentials are given after the gas triode 23 has been fired. Point 35 has been reduced to +45 volts while point 37 remains unchanged. As a consequence current will begin to flow in the branch circuit composed of 30, 32 and the diode 27. Due to the plate resistance of diode 27, point 40 will assume a potential lower than that of 37. For illustrative purposes the potential across the diode is taken as 1 volt. In practice this potential drop will ordinarily be in the order of magnitude of one-tenth volt. It will be seen that points 40 and 41 now differ in potential by this potential drop and that point 41 is higher. As the flow of current continues the potential across the condenser 32 increases such that the potential at the junction of 30 and 32 is reduced. In column 4 this potential is given as 67 volts. At this moment it is assumed that the second channel is triggered. An examination of the potentials existing shows the condenser has been charged to a difference of potential of 3 volts. This approximates the full scale reading of the instrument. At this same time due to the trigger action of the second channel point 37 is now caused to drop to +45. As a consequence no further action takes place (since point 35 is also at +45) and current flow in diode 27 ceases. Column 5 gives the potentials existing at the several points. It will be noted that since condenser 32 was charged to three volts point 40 will be three volts higher than the junction of 30 and 32. Since this junction is now at +45 volts (current flow has ceased through 30) point 40 will be at a potential of +48. Comparing this with that of point 41 it will be seen that point 40 is higher by the amount of charge induced on the condenser 32. Also as noted previously during the charging process point 40 was lower than point 41. This action gives the meter reading a very characteristic motion. During the charging period the meter needle is constrained to move in a direction opposite to its final reading.

Referring again to the table the last column lists the potentials which obtain if the second channel does not trigger. It will be noted that points 40 and 41 are now of the same potential. This is caused by the fact that the condenser, having been fully charged, does not permit any further flow of current. The potential drop across the diode 27 is therefore reduced to zero and points 40 and 41 are at equal potential. During the course of such happenstance the needle motion of the indicating instrument rapidly approaches zero reading. The speed at which the needle approaches zero reading is a function of the speed at which the condenser charges and therefore the speed at which the current in the diode decreases.

As a result it will be seen that a single trigger will not produce an "off scale" meter reading thus avoiding damage to the instrument.

In a similar manner, a time interval produced in the reverse order, that is, for the sound striking microphone 12 and then microphone 11, the final potential at point 41 would exceed the final potential at point 40 by the proper amount. The use of a center reading meter in vacuum tube voltmeter 22 would then indicate the time interval on the other side of its center point. Thus the algebraic sign as well as the magnitude of the time interval is given, thereby indicating the direction of sound source with respect to the normal to the base line.

Referring to Figure 5 which is a schematic diagram of the vacuum tube voltmeter 22, it is seen that the voltmeter is of the cathode follower type. It provides a substantially linear response over a wide range of grid potential, over which range it maintains its high input impedance. The grids of the two vacuum tubes 42 and 43 are tied respectively to points 40 and 41 of the timing circuit Fig. 4. The plate current causes a potential drop across the cathode load resistor which enables the cathode to follow the potential of the grid. In order to obtain a high input impedance it is necessary to operate the tube with a negative grid bias. It has been found that a large cathode load resistor coupled with a fairly high plate potential will cause the bias to remain negative over a signal input range of from 0 to +100 volts. In general the cathode follower type of circuit provides the ideal manner for obtaining 100% feedback. It is well known that a high degree of linearity may be obtained when the product of the amplification factor and the percentage feedback is large. For example, the tube type 6SJ7, which has a high amplification factor, may be used with excellent results in this circuit. The difference in potential between the cathodes is measured with a microammeter 44 in series with a high resistance to reduce interaction between the two cathode circuits. This potential difference is a measure of the potential difference existing at the grids, which in turn is proportional to the charge trapped on one of the condensers 32 or 33. This, as has been indicated above, is in turn closely proportional to the time interval between sound pulses arriving at microphones 11 and 12. Therefore, the potential difference at the cathodes is a direct measure of the time interval, and for convenience the microammeter 44 may be calibrated directly in milliseconds.

When our device is utilized in the field it becomes necessary to maintain the calibration of the instrument as the batteries supplying the device become exhausted. The potential difference between points 40 and 41 is a measure of the time interval, provided the normal voltages across resistors 28 and 29 are held constant. The voltages across resistors 28 and 29 drop as the batteries run down, so a dual variable resistor 45 and 46 is used to reset the voltage values. (See Figure 6.) With the batteries at full charge the voltage across resistors 28 and 29 is reduced. As the battery voltage goes down, resistance in the circuit is reduced by means of dual variable resistor 45 and 46 to keep the voltage across resistors 28 and 29 constant.

In calibration, the first step is to set the potential across resistors 28 and 29 at a fixed value (say 26 volts). This is done by connecting the microammeter 44 and a series resistor across points 35 and 36 as shown in position A of switch 52, and operating the dual variable resistor 45 and 46 until this potential is obtained.

Figure 7:
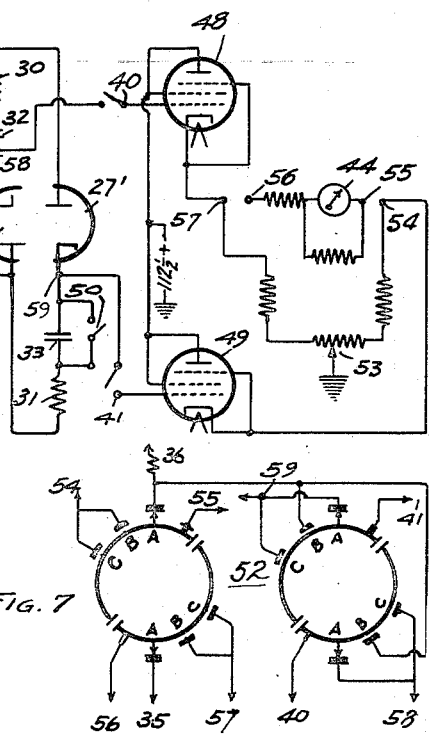

Rotary switch 52 shown schematically in Fig. 7 may be of the conventional wafer type having two wafers and two circuits per wafer with three contact positions A, B and C for each circuit. The semi-circular contact arcs of the left hand wafer are connected in all switch positions to terminals 55 and 56 of the micro-ammeter 44 of Fig. 6, while the corresponding contact arcs of the right hand wafer are connected, in all positions to control grids 40 and 41 of tubes 48 and 49. The numerals shown on the leads of the switch all refer to corresponding numerals of Fig. 6 to which they are connected, the actual connections being omitted to avoid confusion. As the switch is moved through the successive positions A, B and C, the contact arrows shown for position A move to corresponding positions B and C for both wafers. Thus for position A, as shown, the contact arrows on the left hand wafer connect the micro-ammeter 44 (with its included series resistor) across cathode resistor 28 at terminals 35 and 36 measuring the potential drop thereof. Connections for other positions may be traced similarly.

The next step is to adjust the vacuum tube voltmeter to zero. This is done by operating the switch 52 to position B and adjusting potentiometer 53 until the meter reads zero. In this condition, the grids of the vacuum tube voltmeter tubes 48 and 49 are connected together and are at a potential of +45 volts. The third and final step in the calibration procedure is to remove two forms of unbalance. The first form of unbalance is due to the fact that the potential across resistor 28 was set accurately with the meter and across resistor 29 only approximately because the dual control resistors 45 and 46 are not perfectly matched. The second unbalance is produced by the difference in emission potential existing in the diodes 27 and 27' when there is no external potential applied across them. This emission potential varies slightly from tube to tube. By placing switch 52 in position C, and momentarily shorting condensers 32 and 33 by switches 50, 51 any unbalance will be disclosed by the meter needle drifting to a new reading when the short circuit is removed from condensers 32 and 33. Such drift is eliminated by operating the variable resistor 47, such that no variation in reading is obtained when the switches 50, 51 are operated. In this condition the position of the microammeter needle may be slightly displaced from the zero, but this will have no effect on the final reading because the slight displacement is caused by the fact that the grids are at +71 volts whereas the vacuum tube voltmeter was calibrated at +45 volts. Since the final readings are made with the grids at about +45 volts, the variation obtained when they are at +71 volts is unimportant.

The gas tubes 23 and 24 are deionized manually by introducing a large resistance 60 between the cathode and ground by means of switch 61 which is normally closed. The introduction of a resistance instead of a simple opening of the circuit provides a leakage path for any charge accumulating on the cathode, and hence lessens surge potentials when the switch is shorted again. Switch 38, normally closed, is an "on" and "off" switch connecting a 90 volt source of potential to plates and grids of tubes 23, 24 and 25, 26 through suitable resistors respectively.

Condensers such as 62 and 63 between the cathodes and the grids of the gas tubes 23 and 24, respectively, may be added for the purpose of reducing the response of the device to high frequencies outside of the range normally utilized. These condensers also serve to reduce the transient when the device is reset. Resistances 64 and 65 in the circuits of the grids of these gas tubes serve to reduce the effect on these tubes of impulses received after either tube with which the resistance is associated has triggered, thereby preventing disturbance of the timing circuit by these impulses. These two resistances also contribute to the effect of condensers 62 and 63 in the response of the device.

Neon tubes 66 and 67 with their associated resistors 68 and 69, respectively, serve to indicate when the trigger tubes have functioned. They are illuminated in the initial condition and each is extinguished when its associated tube triggers. It is the purpose of these neon tubes to indicate whether or not a signal sufficient to cause triggering is received at both of the microphones. Without these tubes an extraneous signal triggering only one microphone would give a false reading and a signal arriving at both microphones simultaneously would give no visual evidence of the device having functioned. Since that reading would represent a sound source approximately on the normal to the base line the neon tubes eliminate the loss of what would otherwise be an entirely valid observation.

By calibrating the scale of meter 44 directly in milliseconds, a direct reading may be had of the interval between the arrival times of sound energy at microphones 11 and 12.

The use as described above of two or more sets of equipment at separated locations along a front facing the source of sound energy will enable the determination of the line of direction of the sound source from each of the locations. By the method of intersection of these lines of direction the location or range of the source of sound may then be determined.

Further embodiments, modifications and variations may be resorted to within the spirit of the invention as herein claimed.

We claim:

1. A device for measuring the time interval between the arrival of a pulse of sound wave energy at two separated sound sensitive means from a distant sound source, comprising means for converting said pulse of sound wave energy into an equivalent pulse of electrical energy at each sound sensitive means, means for initiating a flow of electrical energy at instant of first pulse, means for stopping said flow at instant for second pulse so that the duration of flow is equal to the difference in the sound arrival times at the said sound sensitive means, means to produce a voltage whose magnitude is proportional to said difference in sound arrival times, and means for indicating the magnitude of said voltage, said initiating means including a gas discharge tube responsive to said first pulse having a grid biased beyond cut-off and an anode resistor connecting the anode to a source of positive potential, said stopping means including a similar biased gas tube responsive to said second pulse; said voltage producing means including a pair of normally conducting vacuum tubes having grids direct coupled to the anodes of said gas tubes respectively, cathode resistors connected to a point of predetermined positive potential less than aforesaid anode potential source, and anode connected to a common point of potential higher than said predetermined potential; a pair of timing circuits bridged from cathode to cathode of said vacuum tubes to receive the output thereof, each circuit including in series a resistor, a condenser and a diode having its cathode connected to the condenser, one circuit having the sequence of elements arranged in reverse order, whereby a charge proportional to the difference of arrival times is accumulated on one of said condensers; said indicating means including a vacuum tube voltmeter having input terminals connected to the cathodes of said diodes respectively.

2. A device for measuring the time interval between the arrival of a pulse of sound wave energy at two separated sound sensitive means from a distant sound source, comprising, means for converting said pulses of sound wave energy into equivalent pulses of electrical energy, means for amplifying said electrical energy, means for producing a flow of electrical energy the duration of which is equal to the difference in the sound wave energy arrival times at the said two sound sensitive means, means for producing from said flow a voltage whose magnitude is proportional to said difference in sound arrival times, and means to indicate the magnitude of said voltage and to indicate the sound sensitive means at which the pulses of sound wave energy arrived first, said flow producing means including a pair of gas discharge tubes responsive respectively to said sound sensitive means having grids normally biased beyond cut-off anodes energized through anode resistors connected to a source of positive potential, and a pair of vacuum tubes having grids direct coupled to the gas tube anodes respectively, and cathode resistors connected to a point of predetermined positive potential less than said gas tube anode potential source; said voltage producing means including a pair of circuits bridged from cathode to cathode of said pair of vacuum tubes, each circuit including in series a resistor, a condenser, and a diode having its cathode connected to the condenser, one of said circuits having the sequence of elements arranged in reverse order; said voltage indicating means including a center zero vacuum tube voltmeter having input terminals connected to the cathodes of said diodes respectively, whereby the time interval is measured by the voltmeter deflection and the order of pulse sequence is indicated by the direction of the deflection.

3. In a device of the class described, comprising two symmetrical electrical channels, each channel having a microphone, an amplifier, and a trigger circuit, said two microphones being situated apart and arranged to receive pulses of sound energy from a distant sound source, means to apply the outputs of said trigger circuits successively to control the flow of charging current through a timing condenser the duration of which is equal to the difference in arrival times at the microphones of sound energy pulses from said distant sound source, and vacuum tube voltmeter means to indicate the voltage of said timing condenser the magnitude of which is proportional to the difference in said sound arrival times; said trigger circuits including a pair of gas discharge tubes located in the respective sound pulse responsive channels having grids biased beyond cut-off and anode resistors connected to a source of positive potential; said trigger circuit applying means including a pair of vacuum tubes having grids direct coupled to the anodes of said gas tubes respectively, cathode resistors connected to a point of predetermined positive potential less than said anode potential source and anodes connected to a common point of potential higher than said predetermined potential; said timing condenser circuit including a first and a second circuit bridged from cathode to cathode of said pair of vacuum tubes to receive the output thereof, said first circuit including in series a resistor, a timing condenser, and a diode having its cathode connected to the condenser, said second circuit being identical with first circuit but having the sequence of elements arranged in reverse order; said vacuum tube voltmeter means having input terminals connected respectively to the cathodes of said timing circuit diodes.

4. A device for measuring the time interval between the arrival of sound wave energy at two separated sound sensitive means from a distant sound source, comprising means for converting the pulse of sound wave energy arriving at each sound sensitive device to an equivalent pulse of electrical energy, means including two symmetrical electric channels one for each sound sensitive means, means in each of said channels forming a trigger circuit, means to apply said trigger circuit outputs to produce a pulse of electrical energy the duration of which is equal to the said time interval, means to produce a voltage the magnitude of which is proportional to the said time interval, and vacuum tube voltmeter means to indicate the magnitude of said voltage and which sound sensitive means first received the sound wave energy; said trigger circuits including a pair of gas discharge tubes located in the respective sound pulse responsive channels having grids biased beyond cut-off and anode resistors connected to a source of positive potential; said trigger circuit output applying means including a pair of vacuum tubes having grids direct coupled to the anodes of said gas tubes respectively, cathode resistors connected to a point of predetermined positive potential less than said anode potential source and anodes connected to a point of potential higher than said predetermined potential; said time interval voltage producing means including a pair of timing circuits bridged between the cathodes of said vacuum tubes, each said circuit including in series a resistor, a timing condenser, and a diode having its cathode connected to the condenser, one of said circuits having the sequence of elements arranged in the reverse order; said vacuum tube voltmeter including a pair of vacuum tubes having cathode resistor grids connected respectively to the cathodes of said timing circuit diodes and a current indicating meter having input terminals connected to the cathodes of said pair of vacuum tubes.

5. A device for measuring the time interval between the arrival of sound wave energy at two separated sound sensitive means from a distant sound source, comprising means for converting the sound wave energy arriving at each of said sound sensitive means into electrical energy, means forming two symmetrical electrical channels, one for each sound sensitive means, an amplifier for each of said channels, a trigger circuit including a gas discharge tube for each of said channels, means to deionize said tubes, pulse timing means to combine said trigger circuit outputs to produce a pulse of electrical energy the duration of which is equal to said time interval, means to produce a voltage the magnitude of which is proportional to said time interval and means to indicate the magnitude of said voltage, said trigger circuits including a pair of gas discharge tubes having grids biased beyond cut-off and anode resistors connected to a source of positive potential; said pulse timing means including a pair of vacuum tubes having grids direct coupled to the anodes of said gas tubes respectively, cathode resistors connected to a point of predetermined positive potential less than said anode potential source and anodes connected to a point of potential higher than said predetermined potential; said voltage producing means including a first and a second circuit bridged from cathode to cathode of said pair of vacuum tubes to receive the output thereof, first circuit including in series a resistor, a condenser, and a diode having its cathode connected to the condenser, said second circuit being identical with first circuit but having the sequence of elements arranged in reverse order; said voltage indicating means having input terminals connected to the cathodes of said diodes respectively.

6. A device for measuring the time interval between the arrival of sound wave energy at two separate microphones from a distant sound source, comprising means including two symmetrical electrical channels, one for each microphone, and an amplifier for each channel, a trigger circuit for each channel including a normally non-conducting gas tube and a normally conducting vacuum tube, means to apply said trigger circuit outputs to produce a pulse of electric current the duration of which is equal to said time interval, timing condenser means to produce from said pulse a voltage the magnitude of which is proportional to said time interval, and a vacuum tube voltmeter to indicate the magnitude of said voltage and which of said microphones first received the sound wave energy, said trigger circuit gas tubes located in each channel having grids biased beyond cut-off and anode resistors connected to a source of positive potential; said trigger circuit output applying means including a pair of vacuum tubes having grids direct coupled to said gas tube anodes respectively, cathode resistors connected to a point of predetermined positive potential less than said anode potential source, and anodes connected to a common point of potential higher than said predetermined potential; said timing condenser means including a pair of similar timing circuits bridged between the cathodes of said pair of vacuum tubes, each said circuit including in series a resistor, a timing condenser and a diode having its cathode connected to the condenser, one of said circuits having the sequence of elements arranged in reverse order; said vacuum tube voltmeter including a pair of vacuum tubes having cathode resistor grids connected respectively to the cathodes of said timing circuit diodes and a center zero current indicating meter having input terminals connected to the cathodes of said pair of vacuum tubes.

7. A device for measuring the time interval between the arrival of a sound wave at two sound or impulse sensitive devices comprising two symmetrical electrical channels, each channel being associated with one of the sound or impulse sensitive devices and each having a non-restoring trigger circuit connected to a common pulse timing circuit in such manner that the first channel to receive an impulse starts a flow of electric current and the second channel to receive the impulse stops the flow of said electric current, either channel being capable of acting as a first channel or as a second channel in the sequence of operations, timing condenser means to produce a voltage whose magnitude is proportional to the duration of the flow of said electric current and whose polarity depends upon which channel first received an impulse, and means for indicating the magnitude and polarity of said voltage, said means being calibrated to read directly in time difference and to indicate the sequence of operation of said channels; said non-restoring trigger circuits including a pair of gas discharge tubes located in the respective sound pulse responsive channels having grids biased beyond cut-off and anode resistors connected to a source of positive potential; said pulse timing circuit including a pair of vacuum tubes having grids direct coupled to the anodes of said gas tubes respectively, cathode resistors connected to a point of predetermined positive potential less than said anode potential source, and anodes connected to a common point of potential higher than said predetermined potential; said timing condenser means including a pair of similar timing circuits bridged between the cathodes of said pair of vacuum tubes, each said circuit including in series a resistor, a timing condenser and a diode having its cathode connected to the condenser, one of said circuits having the sequence of elements arranged in reverse order.

THOMAS G. BARNES.
MICHAEL J. BURGER.

REFERENCES CITED

The following references are of record in the file of this patent:

UNITED STATES PATENTS

| Number | Name | Date |
| --- | --- | --- |
| 1,526,337 | Hartley | Feb. 17, 1925 |
| 1,946,290 | Lord | Feb. 6, 1934 |
| 2,021,766 | Bivens | Nov. 19, 1935 |
| 2,206,827 | Prince | July 2, 1940 |
| 2,269,603 | Rockwood | Jan. 13, 1942 |
| 2,301,195 | Bradford | Nov. 10, 1942 |
| 2,400,552 | Hoover, Jr. | May 21, 1946 |

FOREIGN PATENTS

| Number | Country | Date |
| --- | --- | --- |
| 181,665 | Switzerland | Dec. 31, 1935 |